United States Patent
Cui et al.

(10) Patent No.: US 9,680,695 B2
(45) Date of Patent: Jun. 13, 2017

(54) FACILITATING MOBILITY DIMENSIONING VIA DYNAMIC CONFIGURATION OF A SWITCH

(71) Applicants: AT&T INTELLECTUAL PROPERTY I, L.P., Atlanta, GA (US); AT&T Mobility II LLC, Atlanta, GA (US)

(72) Inventors: Zhi Cui, Sugar Hill, GA (US); Milap V. Majmundar, Austin, TX (US); Weihua Ye, Bartlett, IL (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 139 days.

(21) Appl. No.: 14/523,536

(22) Filed: Oct. 24, 2014

(65) Prior Publication Data

US 2016/0119932 A1    Apr. 28, 2016

(51) Int. Cl.
*H04W 4/00* (2009.01)
*H04L 12/24* (2006.01)
(Continued)

(52) U.S. Cl.
CPC ...... *H04L 41/0803* (2013.01); *H04L 41/0816* (2013.01); *H04L 41/147* (2013.01);
(Continued)

(58) Field of Classification Search
None
See application file for complete search history.

(56) References Cited

U.S. PATENT DOCUMENTS 8,738,022 B2    5/2014  Xing et al.
2007/0081452 A1*  4/2007  Walter .............. H04L 29/06027
                                                370/229
(Continued)

FOREIGN PATENT DOCUMENTS

EP    1458208 B1    5/2005
EP    1101382 B1    6/2005
(Continued)

OTHER PUBLICATIONS

Staring, "Applying the Cloud Computing Model in LTE Based Cellular Systems," Proceedings of the 17th Twente Student Conference on IT, 2012, 9 pages, The Netherlands, Retrieved on Aug. 18, 2014.

(Continued)

*Primary Examiner* — Bob Phunkulh
(74) *Attorney, Agent, or Firm* — Amin, Turocy & Watson, LLP

(57) ABSTRACT

Dynamic grouping of cell site devices to network devices that include a group of baseband processing devices is facilitated. One method includes determining, by a device including a processor, respective load information for cell site devices of respective cell sites associated with a network; and determining, by the device, interference information associated with the cell site devices. The method also includes determining, by the device, configuration information of a switch device communicatively coupled between the cell site devices and network devices that include a group of baseband processing devices. The determining the configuration information is based on the respective load information of the cell site devices and the interference information associated with the cell site devices.

20 Claims, 10 Drawing Sheets

(51) Int. Cl.
*H04W 88/08* (2009.01)
*H04W 24/02* (2009.01)
*H04W 28/16* (2009.01)
*H04L 12/26* (2006.01)

(52) U.S. Cl.
CPC ......... *H04W 24/02* (2013.01); *H04W 88/085* (2013.01); *H04L 43/0817* (2013.01); *H04W 28/16* (2013.01)

(56) References Cited

U.S. PATENT DOCUMENTS

| | | | | |
|---|---|---|---|---|
| 2007/0082656 | A1* | 4/2007 | Stieglitz | H04L 63/08 455/411 |
| 2007/0097933 | A1* | 5/2007 | Kuc | H04W 52/0216 370/338 |
| 2007/0153741 | A1* | 7/2007 | Blanchette | H04L 45/66 370/331 |
| 2009/0059872 | A1* | 3/2009 | Malik | H04W 4/02 370/338 |
| 2009/0147697 | A1* | 6/2009 | Malik | H04W 48/08 370/254 |
| 2010/0014426 | A1* | 1/2010 | Cavalli | H04W 36/22 370/235 |
| 2011/0310941 | A1 | 12/2011 | Kenington | |
| 2012/0142356 | A1* | 6/2012 | Serravalle | H04W 36/0016 455/436 |
| 2012/0155446 | A1 | 6/2012 | Machida | |
| 2013/0003548 | A1* | 1/2013 | Sridhar | H04L 47/125 370/235 |
| 2013/0114464 | A1* | 5/2013 | Tarraf | H04W 24/02 370/254 |
| 2013/0242748 | A1* | 9/2013 | Mangalvedhe | H04W 24/02 370/241 |
| 2013/0343755 | A1 | 12/2013 | Cvijetic et al. | |
| 2014/0029431 | A1 | 1/2014 | Haberland et al. | |
| 2014/0031049 | A1* | 1/2014 | Sundaresan | H04W 16/02 455/447 |
| 2014/0362840 | A1* | 12/2014 | Wong | H04W 88/06 370/338 |
| 2016/0021564 | A1* | 1/2016 | Agarwal | H04W 28/0289 455/452.2 |
| 2016/0029248 | A1* | 1/2016 | Syed | H04W 28/08 370/235 |
| 2016/0050587 | A1* | 2/2016 | Lam | H04W 28/08 370/235 |
| 2016/0227454 | A1* | 8/2016 | Toskala | H04W 76/021 |

FOREIGN PATENT DOCUMENTS

| | | |
|---|---|---|
| EP | 1287647 B1 | 8/2008 |
| EP | 1992121 A2 | 11/2008 |
| EP | 2135471 B1 | 8/2011 |
| EP | 1419666 B1 | 6/2012 |
| EP | 2269420 B1 | 8/2012 |
| GB | 2508383 A | 6/2014 |
| WO | 2006040653 A1 | 4/2006 |
| WO | 2007131871 A1 | 11/2007 |
| WO | 2013026818 A1 | 2/2013 |
| WO | 2013116988 A1 | 8/2013 |
| WO | 2013126085 A1 | 8/2013 |
| WO | 2014005759 A1 | 1/2014 |
| WO | 2014048919 A1 | 4/2014 |

OTHER PUBLICATIONS

Monserrat, et al., "Rethinking the Mobile and Wireless Network Architecture," The METIS Research into 5G, 5 Pages, Retrieved on Aug. 18, 2014.

Galis, et al., "Towards In-Network Clouds in Future Internet," The Future Internet Assembly, 2011, pp. 19-33, vol. 6656, Springer-Verlag, Retrieved on Aug. 18, 2014.

Chen, et al., "Open Wireless System Cloud: An Architecture for Future Wireless Communications System," Network and Communication Technologies, 2012, 8 Pages, vol. 1, Issue 2, Canadian Center of Science and Education, Retrieved on Aug. 18, 2014.

Ali-Ahmad, et al., "An SDN-based Network Architecture for Extremely Dense Wireless Networks," Future Networks and Services (SDN4FNS), 2013, 7 Pages, IEEE, Retrieved on Aug. 18, 2014.

Ohlen, et al., "Software-Defined Networking in a Multi-Purpose DWDM-Centric Metro/Aggregation Network," Globecom Workshops (GC Wkshps), 2013, 6 Pages, Ericsson Research, Stockholm, Sweden, Retrieved on Aug. 18, 2014.

* cited by examiner

FACILITATING MOBILITY DIMENSIONING VIA DYNAMIC CONFIGURATION OF A SWITCH

TECHNICAL FIELD

The subject disclosure relates generally to mobility networks and to facilitating mobility dimensioning via dynamic configuration of a switch in a mobility network.

DETAILED DESCRIPTION

Figure 1:
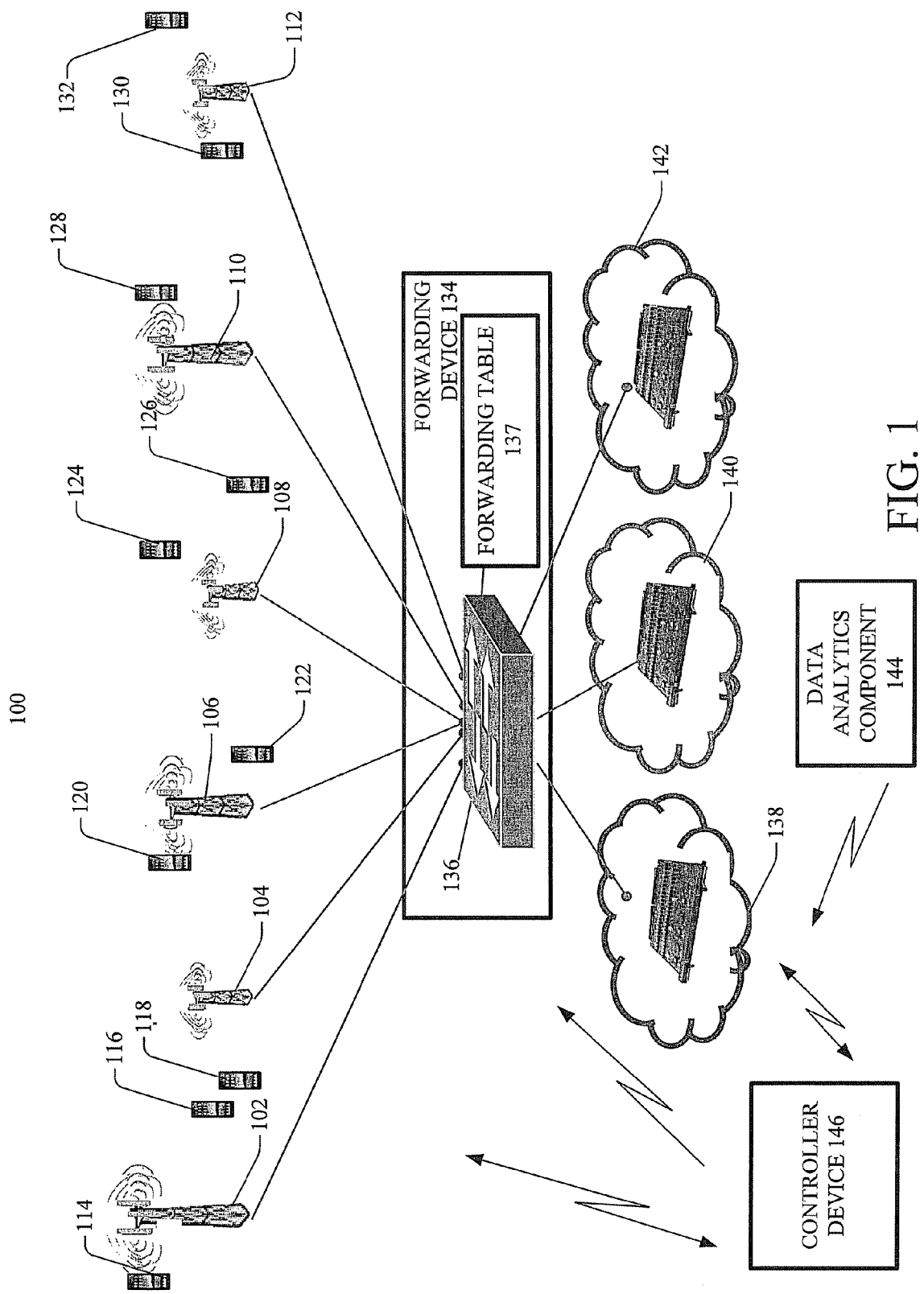
FIG. 1 illustrates an example block diagram of a system in which mobility dimensioning via dynamic configuration of a common public radio interface (CPRI) switch can be facilitated in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP),"

"Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

The trend in mobility networks is towards a higher degree of densification and heterogeneity. As such, tighter coordination among cells is very critical for better interference, radio resource management, and network capacity. A centralized radio access network (CRAN) offers the benefit of maximum flexibility and resource sharing using baseband processing unit (BBU) pooling. A typical wireless telecom station includes BBUs and cell site devices. In some embodiments, cell site devices can be or include the structure and/or functionality of remote radio units (RRUs). The BBUs and cell site devices are typically coupled to one another via optical fiber. BBUs are typically responsible for communication through the physical interface.

A CPRI switch device is typically used in the front haul to provide connectivity between a remote cell site device and a central unit. Further, the CPRI switch device is used to connect multi-mobile cell site devices to multi-BBUs basebands.

In some cases, grouping a subset of RRUs to associate them with a BBU is performed statically employing Operations Support Systems (OSS) and/or manual configuration, which results in high operation cost. Further, another problem is that inter-site carrier aggregation is most efficient with tight coordination between inter site cells, notwithstanding the trend is that of more devices, which are moving and therefore coordination is more difficult. Connecting the best subset of cell site devices to the best BBU pool device can be critical to meet the latency requirement of inter-site carrier aggregation.

Inter-site carrier aggregation can work well within the same BBU pool devices. However, because mobile devices are moving, it can be challenging to keep the mobile devices on the same BBU pool device. For example, in the morning, a mobile device might be in one location and when the workday is over, the same mobile device might be in another location altogether). As such, dynamic connection to the BBU pool device, which can also account for changes related to interference, loading, mobility, result in the best inter-site aggregation.

One or more of the embodiments described herein can provide for efficient and dynamic grouping of particular cell site devices to BBU pool devices. As used herein, the term "BBU pool devices" can mean network devices that include a group of baseband processing devices. For example, a BBU pool device can include a control device and a group of baseband processing devices communicatively coupled to one another. The control device for a BBU pool device can perform resource management by allocating one or more baseband processing devices within a BBU pool device for performing baseband processing. In some embodiments, the BBU pool device is located in the eNB or base station of a system.

The problems to be solved are to proactively and intelligently make handover decisions from one BBU pool device to another BBU pool device, which aims to achieve seamless mobility and improve the overall service experience.

Embodiments described herein include systems, methods, apparatus and/or computer-readable storage media facilitating mobility dimensioning via dynamic configuration of a CPRI switch device. In one embodiment, a method includes determining, by a device comprising a processor, respective load information for cell site devices of respective cell sites associated with a network; and determining, by the device, interference information associated with the cell site devices. The method also includes determining, by the device, configuration information of a switch device communicatively coupled between the cell site devices and network devices that include a group of baseband processing devices, wherein the determining the configuration information is based on the respective load information of the cell site devices and the interference information associated with the cell site devices.

In another embodiment, an apparatus includes a memory to store executable instructions; and a processor, coupled to the memory, that facilitates execution of the executable instructions to perform operations. The operations include: determining first load information for cell site devices of respective cell sites associated with a network at a first defined time, and determining second load information for the cell site devices of the respective cell sites associated with the network at a second defined time; and determining, at the first defined time, first configuration information of a switch device communicatively coupled between the cell site devices and network devices that include a group of baseband processing devices, wherein the determining the configuration information is based on the first load information of the cell site devices. The operations also include: determining that the second load information satisfies a defined condition relative to the first load information; and determining, at the second defined time, second configuration information of the switch device communicatively coupled between the cell site devices and the network devices that include a group of baseband processing devices, wherein the determining the configuration information is based on the second load information of the cell site devices relative to the first load information of the cell site devices.

In another embodiment, a computer-readable storage device storing executable instructions that, in response to execution, cause a first device including a processor to perform operations is provided. The operations can include: determining forwarding information mapping respective cell site devices to respective network devices that include a group of baseband processing devices, wherein the cell site devices are mapped based on network traffic trending information, and wherein the network traffic trending information comprises information representing changes in network traffic associated with the cell site devices; and controlling determination of the forwarding information; wherein forwarding according to the forwarding information is performed by a second device within the network, the first device being distinct from the second device.

Embodiments described herein can provide a system that de-couples the portion of the network that determines where traffic should be forwarding from a CPRI switch device from the portion of the system that performs the forwarding of the traffic. Dynamic mobility dimensioning in a cloud RAN is enhanced.

A controller device is employed for dynamic CPRI switch device configuration in cloud RAN (C-RAN) based on cell site real-time load conditions, network traffic trending information and/or interference between cells or user equipment (UEs). Dynamic and automated mobility network dimensioning, adaptive grouping of cells for network performance optimization, interference mitigation, improved inter-site carrier aggregation, improved system capacity and/or improved end user experience can result employing one or more of the embodiments.

FIG. 1 illustrates an example block diagram of a system in which mobility dimensioning via dynamic configuration of a CPRI switch device can be facilitated in accordance with one or more embodiments. System 100 utilizes separation of control and forwarding functionality for dynamic CPRI switch device forwarding configuration in a cloud RAN (C-RAN). System 100 facilitates the dynamic CPRI switch device forwarding configuration updates based on cell site device load conditions, network traffic trending information and/or interference (or projected interference mitigation) between devices (e.g., between user equipment (UEs)).

With regard to the separation of the control structure and functionality and the forwarding structure and functionality, in the embodiments described, centralized control via a controller device is distinct from forwarding via the forwarding device. The configuration of the embodiments facilitates separate scaling of forwarding and control structure/functionality to accommodate control or forwarding level changes over time. In the embodiments described herein, employing the controller device can also advantageously provide more flexibility in configuring the CPRI switch device 136 because configuration can be based on load, inter-cell interference, mobility patterns or any number of other factors.

System 100 can include cell site devices 102, 104, 106, 108, 110, 112, mobile devices 114, 116, 118, 120, 122, 124, 126, 128, 130, 132, forwarding device 134, BBU pool devices 138, 140, 142, data analytics component 144 and/or controller device 146. In various embodiments, one or more of cell site devices 102, 104, 106, 108, 110, 112, mobile devices 114, 116, 118, 120, 122, 124, 126, 128, 130, 132, forwarding device 134, CPRI switch device 136, BBU pool devices 138, 140, 142, data analytics component 144 and/or controller device 146 can be electrically and/or communicatively coupled to one another to perform one or more functions of system 100. In one embodiment, as shown, forwarding device 134 can include CPRI switch device 136 and forwarding table 137. While the embodiments described herein refer to CPRI switch device 136 and CPRI switch devices generally, in various different embodiments, the switch devices described, shown and/or claimed herein can include, but are not limited to, any type of switch (and which uses any of a number of different interface technologies), including, but not limited to, evolutions of the CPRI interface that are yet to be developed.

In the embodiment shown, cell site devices 102, 104, 106, 108, 110, 112 connect to ports on a first side of CPRI switch device 136 of forwarding device 134, and BBU pool devices 138, 140, 142 connect to CPRI switch device 136 on a second side of CPRI switch device 136.

Mobile devices 114, 116, 118, 120, 122, 124, 126, 128, 130, 132 can be any number of different devices that communicate over a wireless communication channel (not shown). For example, mobile devices 114, 116, 118, 120, 122, 124, 126, 128, 130, 132 can include, but are not limited to, smart phones, laptops, personal computers (PCs), communication systems for connected cars or the like. In some embodiments, one or more (or each) of mobile devices 114, 116, 118, 120, 122, 124, 126, 128, 130, 132 can be communicatively coupled to one of cell site devices 102, 104, 106, 108, 110, 112.

Mobile devices 114, 116, 118, 120, 122, 124, 126, 128, 130, 132 can generate, transmit and/or receive information via cell site devices 102, 104, 106, 108, 110, 112 in various embodiments. The information can be forwarded to/from cell site devices 102, 104, 106, 108, 110, 112 via CPRI switch device 136. In various embodiments, CPRI switch device 136 can be a switch that is communicatively coupled between one or more of cell site devices 102, 104, 106, 108, 110, 112 and one or more of BBU pool devices 138, 140, 142.

CPRI switch device 136 can be configured and re-configured from time to time based on various information received and/or processed by controller device 146. As such, the forwarding functionality of system 100 can be separate from the control functionality of system 100. By way of example, but not limitation, forwarding of traffic to/from mobile devices 114, 116, 118, 120, 122, 124, 126, 128, 130, 132 via cell site devices 102, 104, 106, 108, 110, 112 can be performed via CPRI switch device 136 of forwarding device 134 while the control functionality can be performed by controller device 146.

In one embodiment, controller device 146 can receive load conditions from one or more of cell site devices 102, 104, 106, 108, 110, 112 for the one or more cell site devices 102, 104, 106, 108, 110, 112. Controller device 146 can also receive network load trending information, real-time load condition information and/or any other type of network data and/or analysis of network data from data analytics component 144.

In some embodiments, controller device 146 can receive inter-cell interference information from one or more of BBU pool devices 138, 140, 142. Controller device 146 can also dynamically determine information with which to populate forwarding table 137 to facilitate configuration of CPRI switch device 136. In some embodiments, the configuration can be based on network load condition of one or more of the cell site devices, trending of the network load of one or more cell site devices and/or interference pattern among cell site devices. In other embodiments, the configuration can be based on other factors including, but not limited to, mobility of one or more of mobile devices 114, 116, 118, 120, 122, 124, 126, 128, 130, 132, interference mitigation between two or more of devices (e.g., UE) in the network or the like.

In one embodiment, the controller device 146 determines respective load information for one or more cell site devices 102, 104, 106, 108, 110, 112 of respective cell sites associated with a network. Controller device 146 determines inter-cell interference information associated with the one or more cell site devices 102, 104, 106, 108, 110, 112 and/or interference between one or more devices (e.g., UEs) in the network. Controller device 146 determines configuration information of CPRI switch device 136 communicatively coupled between the one or more cell site devices 102, 104, 106, 108, 110, 112 and one of BBU pool devices 138, 140, 142 of the network, wherein the determining the configuration information is based on one or more of the respective load information of the one or more cell site devices 102, 104, 106, 108, 110, 112, the inter-cell interference information associated with the one or more cell site devices 102, 104, 106, 108, 110, 112, and/or the network traffic trending information associated with the one or more cell site devices 102, 104, 106, 108, 110, 112.

In one embodiment, the configuration information of CPRI switch device 136 is based on a forwarding data structure. The forwarding data structure can be or include information structured such as that included in forwarding table 137, in one embodiment, including, but not limited to, information indicating an identity of one or more cell site devices (e.g., cell site devices 102, 104) of the cell site devices and an identity of a BBU pool device (e.g., BBU pool device 138) to communicatively couple to one another. For example, controller device 146 can generate forwarding table configuration information (having the forwarding data structure) to be stored as forwarding table 137. Controller device 146 can therefore facilitate configuration of CPRI switch device 136 in accordance with forwarding table 137 based on the respective load information for the one or more cell site devices 102, 104, 106, 108, 110, 112.

In some embodiments, the forwarding table configuration information can also include information indicative of timing during which the forwarding should be performed. In this regard, a CPRI switch device 136 can be configured with a first grouping of specific cell site devices with a BBU pool device during one time period (e.g., M-F 8 a.m.-9:30 a.m.) and a second grouping of specific cell site devices with BBU pool device during another time period (e.g., M-F 5:00 p.m.-6:30 p.m.).

In the embodiment shown, cell site devices 102, 104, 106 are associated with BBU pool device 138 while cell site devices 108, 110, 112 are associated with BBU pool device 140. The configuration can be dynamically changed by controller device 146 based on received information at controller device 146 indicative of a change in any network traffic trending information, real-time network traffic information, load conditions at one or more of cell site devices 102, 104, 106, 108, 110, 112, inter-cell interference device and/or interference between devices (e.g., between UEs).

In another embodiment, controller device 146 can determine a first condition or aspect (e.g., first load information for one or more of cell site devices 102, 104, 106, 108, 110, 112) of a network at a first defined time. Controller device 146 can determine a second condition or aspect (e.g., second load information for one or more of cell site devices 102, 104, 106, 108, 110, 112) of a network at a second defined time.

Controller device 146 can determine first configuration information of CPRI switch device 136 communicatively coupled between the one or more of cell site devices 102, 104, 106, 108, 110, 112 and a BBU pool device (e.g., BBU pool device 140) at the first time, wherein the determining the configuration information is based on the first load information of the one or more of cell site devices 102, 104, 106, 108, 110, 112.

Controller device 146 can determine that at least one of the first condition or aspect or the second condition or aspect (e.g., the second load information) satisfies a defined condition (e.g., first load information), and generate configuration information accordingly. As such, for example, controller device 146 can determine second configuration information of CPRI switch device 136 communicatively coupled between the one or more of cell site devices 102, 104, 106, 108, 110, 112 and a BBU pool device (e.g., BBU pool device 140 or BBU pool device 142) of the network at the second time. The determination of the configuration information can be based, for example, on the second condition or aspect (e.g., second load information) of the one or more of cell site devices 102, 104, 106, 108, 110, 112 relative to the first condition or aspect (e.g., first load information of the one or more of cell site devices 102, 104, 106, 108, 110, 112).

In yet another embodiment, controller device 146 can determine forwarding information (or information for forwarding table 137) mapping respective ones of cell site devices 102, 104, 106, 108, 110, 112 to respective BBU pool devices of a network, wherein the cell site devices 102, 104, 106, 108, 110, 112 are mapped based on network traffic trending information.

In these embodiments, controller device 146 can control determination of the forwarding information. Controller device 146 can be a centralized device for the network. By contrast, forwarding is performed by CPRI switch device 136. As such, forwarding control and forwarding functionality are performed by separate devices with forwarding control being performed by controller device 146 and forwarding functionality being performed by CPRI switch device 136.

In some embodiments, controller device 146 can evaluate historical data to determine ones of the one or more cell site devices 102, 104, 106, 108, 110, 112 with associated cell site regions having a historical amount of overlap that satisfies a defined condition. For example, controller device 146 can group those identified cell site devices 102, 104, 106, 108, 110, 112 into the same BBU pool device (e.g., BBU pool device 138) of the BBU pool devices 138, 140, 142.

In various embodiments, adaptive grouping of selected ones of cell site devices 102, 104, 106, 108, 110, 112 with the same BBU pool device of the BBU pool devices 138, 140, 142 is based on estimated interference mitigation.

In some embodiments, controller device 146 steers network traffic to a cell site device of the cell site devices 102, 104, 106, 108, 110, 112 based on performance of the cell site devices 102, 104, 106, 108, 110, 112 and the load information for the cell site devices 102, 104, 106, 108, 110, 112. For example, based on historical data, the most overlapping cells can be grouped into the same BBU pool. Traffic will be steered to the most suitable cell based on the mobile device location, application, Quality of Service (QoS), along with the real-time cell performance and load, etc. Accordingly, in embodiments described herein, handover can be based, for example, on the historical information.

In some embodiments, controller device 146 can make a determination regarding which cell site devices have associated cell site regions that overlap that satisfies a defined condition (e.g., overlap a certain amount) and group these overlapping cell site devices (overlapping cell site device regions) into the same BBU pool. Dynamic CPRI switch device configuration can advantageously allow such grouping.

Controller device 146 can re-allocate BBU pool devices 138, 140, 142 to different cell site devices dynamically and repeat collection/processing of information (e.g., from cell site devices 102, 104, 106, 108,110, data analytics component 144 or the like) and/or configuration process. For example, if the load condition changes or controller device 146 receives information indicative of a different pattern of load trending or if interference changes (e.g., if cell site devices 102, 104 are quite closely overlapped or cell site devices (or UEs) have a close relationship in terms of interference when another cell site device (e.g., cell site device 106) or UE is added), controller device 146 can generate new configuration information.

In one embodiment, a method of performing the functions can be as follows. In step one, one or more (or, in some embodiments, each of the) mobile devices (e.g., UEs) is connected to the CPRI switch device using one or more ports. The control functionality is provided via the controller device 146 and the traffic forwarding functionality is provided via CPRI switch device 136. As such, the forwarding functionality is distinct from the control functionality.

The forwarding can be performed independent of the control. For example, controller device 146 is responsible for determining forwarding table 137 based upon which CPRI switch device 136 operates. In this case, for example, a configuration for CPRI switch device 136 can be determined indicative of which line side of the CPRI port associated with a cell site device will be communicatively coupled to which trunk side of the CPRI port, which corresponds to a BBU pool device.

In step two, one or more (or each, in some embodiments) enhanced node B (eNB), or cell site device, transmit load conditions of the cell site device to controller device 146 directly, or via the BBU pool device. For example, the BBU pool device can provide such information to controller device 146 if the scheduler resides with the BBU pool devices.

In step three, data analytics component 144 can provide, to controller device 146, the network load trending information and/or, if available, real-time load condition information for one or more (or, in some embodiments, each) cell site device. In step four, in some embodiments, one or more (or, in some embodiments, each) BBU pool device (e.g., BBU pool device 138) can optionally provide the inter-cell interference (or device interference (e.g., UE-to-UE interference)) analytics information to controller device 146.

In step five, controller device 146 can dynamically configure the CPRI switch device and/or generate information for dynamic configuration of the CPRI switch device. In some embodiments, controller device 146 can dynamically generate forwarding table 137 (or information for populating forwarding table 137). The configuration for the CPRI switch device and/or the information for generating forwarding table 137 can be based on the information of network load condition of one or more (or, in some embodiments, each) cell site device, trending of the network load of each cell site device and/or interference pattern among cell site devices (or among devices (e.g., between UEs)). This information can be obtained from steps two through four. As a result, the BBU pool device can be dynamically shared by an adaptive group of cell site devices based on network conditions.

Figure 2:
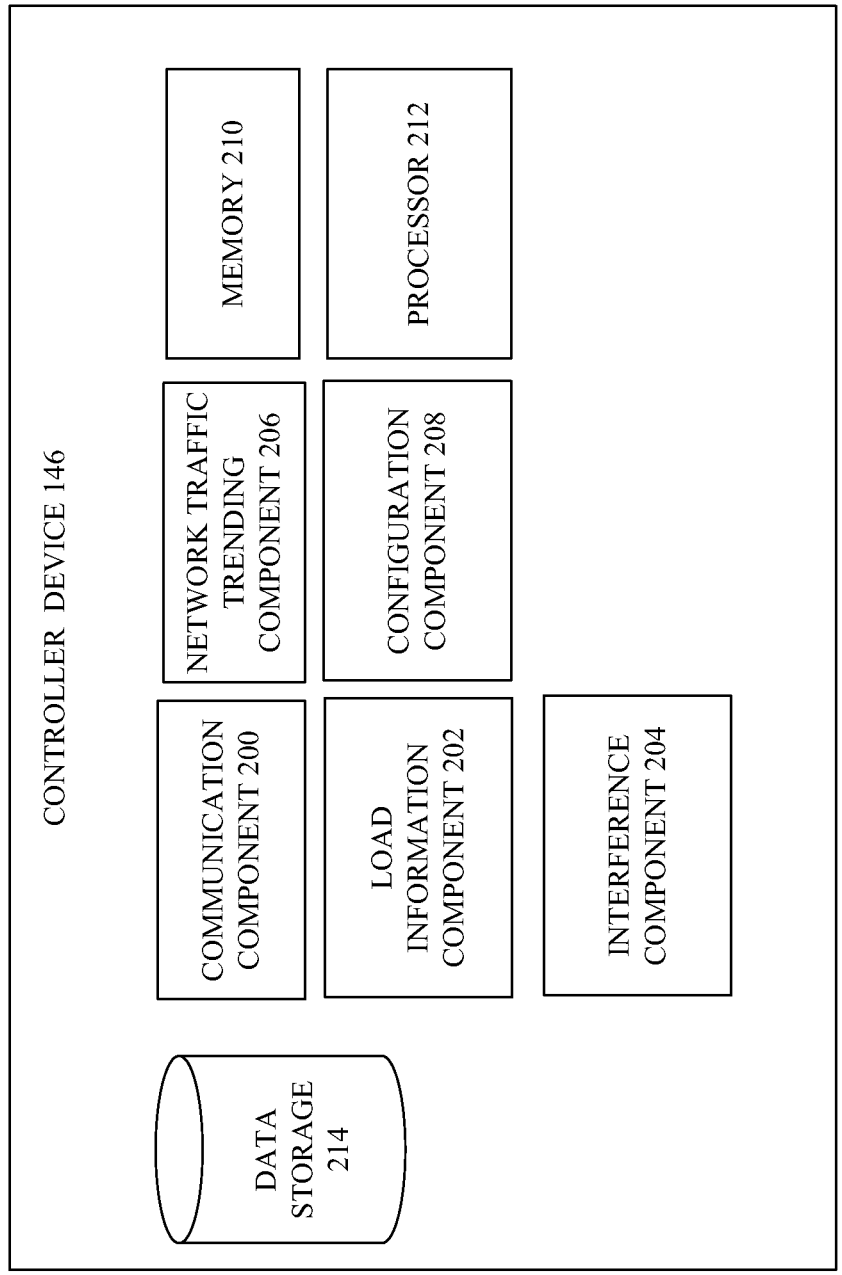
FIG. 2 illustrates an example block diagram of a controller device of the system of FIG. 1 in accordance with one or more embodiments described herein.

FIG. 2 illustrates an example block diagram of a controller device of the system of FIG. 1 in accordance with one or more embodiments described herein. Controller device 102 can include communication component 200, load information component 202, interference component 204, network traffic trending component 206, configuration component 208, memory 210, processor 212 and/or data storage 214. In various embodiments, one or more of communication component 200, load information component 202, interference component 204, network traffic trending component 206, configuration component 208, memory 210, processor 212 and/or data storage 214 can be electrically and/or communicatively coupled to one another to perform one or more functions of controller device 146. Repetitive description of like elements employed in other embodiments described herein is omitted for sake of brevity.

Communication component 200 can receive current and/or past/historical load, interference, network traffic information and/or network traffic trending information. Communication component 200 can transmit configuration information to a forwarding device (e.g., forwarding device 134 of FIGS. 1 and 4) for operation of the CPRI switch device 136. The forwarding device includes CPRI switch device 136 that can include structure and/or functionality to switch traffic to and/or from particular cell site devices to and/or from particular BBU pool devices.

Load information component 202 can process current and/or past load information. For example, the load information can be received from one or more cell site devices. As traffic load changes, the one or more cell site devices can transmit new updated information to load information component 202.

Interference component 204 can process interference information from one or more BBU pool devices. For example, in one embodiment, interference component 204 can process inter-cell interference information from one or more BBU pool devices. As another example, interference component 204 can process device-to-device interference information.

Network traffic trending component 206 can process information indicative of network load trending information, real-time load condition information from a data analytics component of the network. The data analytics component can be any component that can monitor, assess and/or report load trending and/or other traffic-related information for the network or a component of the network.

Configuration component 208 can generate information indicative of which of one or more cell site devices to communicatively couple to a BBU pool device for forwarding information between the cell site devices and the BBU pool devices. The configuration can be based on any number of factors alone or in combination, including, but not limited to, inter-cell interference, network traffic load trending, load conditions for one or more cell site devices or the like. How the particular factors are weighed, balanced or otherwise considered in determining particular pairings of cell site devices with a particular BBU pool device can be operator policy driven in some embodiments.

Memory 210 can store computer-executable instructions that can be executed by processor 212. For example, memory 210 can store instructions for determining pairings between cell site devices and BBU pool devices, processing forwarding table information, processing received, stored and/or expected load condition information, processing received, stored and/or expected network traffic trending information, processing received or stored network traffic real-time information, processing received, stored and/or projected/expected interference or the like. Processor 212 can process computer-readable storage medium computer-executable instructions to perform one or more of the functions described herein with reference to controller device 146 including, but not limited to, determining forwarding/routing links between cell site devices and BBU pool devices, processing forwarding table information or the like, processing load condition information, network traffic trending information, network traffic real-time information, inter-cell (or device-to-device) interference or the like.

Data storage 214 can store identification/forwarding/routing information for one or more cell site devices in the network, identification/forwarding/routing information for one or more BBU pool devices in the network, the contents of the forwarding table, load condition information, network traffic trending information, network traffic real-time information, inter-cell (or device-to-device) interference or the like.

Figure 3:
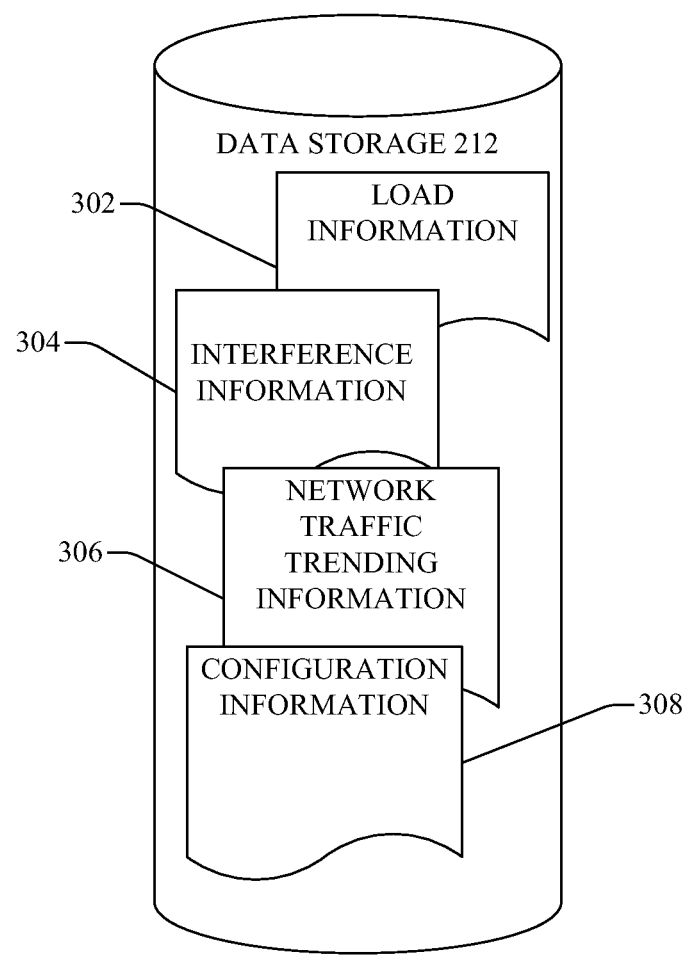
FIG. 3 illustrates an example block diagram of a data storage of the controller device of FIG. 2 that can facilitate mobility dimensioning via dynamic configuration of a CPRI switch device in accordance with one or more embodiments.

FIG. 3 illustrates an example block diagram of data storage of the controller device of FIG. 2 that can facilitate mobility dimensioning via dynamic configuration of a CPRI switch device in accordance with one or more embodiments. Repetitive description of like elements employed in other embodiments described herein is omitted for sake of brevity.

Load information 302 can include information about current or past loading at a cell site device or one or more expected load conditions for a cell site device. Load information 302 can include information identifying one or more cell site devices and corresponding current, past and/or expected loading information.

Interference information 304 can include information describing current and/or past inter-cell interference between two or more cell site regions. Projected inter-cell interference can also be included in some embodiments.

Network traffic trending information 306 can include information about the amount of traffic at one or more areas within the network including, but not limited to, cell site devices. Configuration information can include information about which cell site devices are or have been associated with which BBU pool devices. For example, configuration information can include forwarding table information provided to configure a CPRI switch device to forward traffic between selected cell site devices and a BBU pool device.

Figure 4:
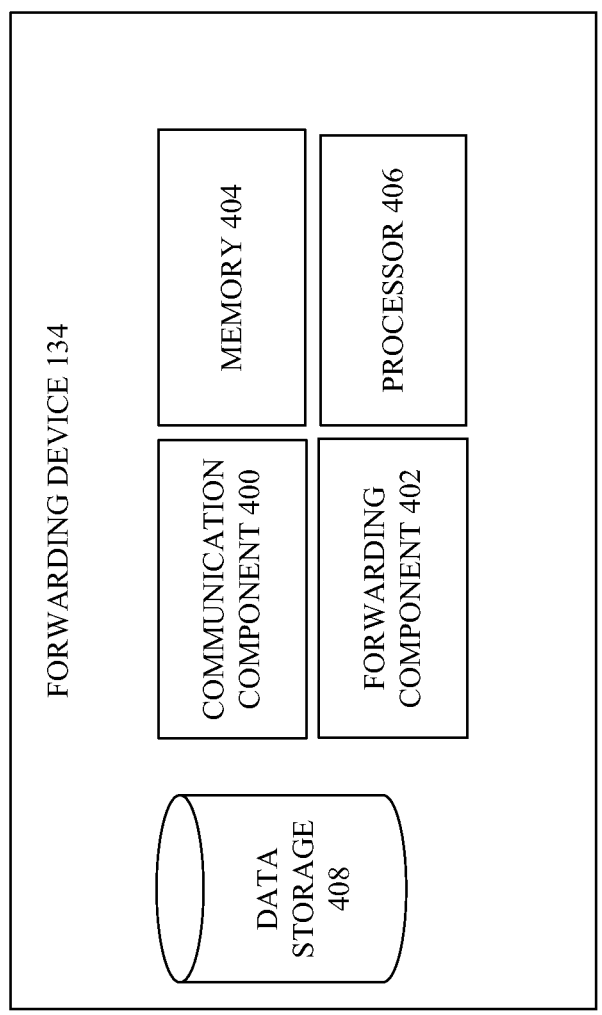
FIG. 4 illustrates an example block diagram of a forwarding device of the system of FIG. 1 for a device in accordance with one or more embodiments.

FIG. 4 illustrates an example block diagram of a forwarding device of the system of FIG. 1 for a device in accordance with one or more embodiments. Forwarding device 134 can include communication component 400, forwarding table component 402, memory 404, processor 406 and/or data storage 410. In various embodiments, one or more of communication component 400, forwarding component 402, memory 404, processor 406 and/or data storage 410 can be electrically and/or communicatively coupled to one another to perform one or more functions of forwarding device 134. Repetitive description of like elements employed in other embodiments described herein is omitted for sake of brevity.

Communication component 400 can include hardware, software and/or a combination of hardware and software configured to receive information from a controller device (such as information for configuring a CPRI switch device).

Forwarding component 402 can forward traffic between specific cell site devices and specific BBU pool devices assigned to the specific cell site devices. In some embodiments, forwarding component 402 is or includes CPRI switch device 136 of FIG. 1. In various embodiments, forwarding component 402 is re-configurable from time to time based on receipt of new/updated configuration information from a controller device. The configuration of forwarding component 402 can be dynamically adjusted to respond to changes in the network, loading at the cell site devices, interference, mobility patterns of mobile devices, network steering of traffic or the like.

Memory 404 can store computer-executable instructions that can be executed by processor 406. For example, memory 404 can store instructions for forwarding traffic between specific cell site devices and BBU pool devices, identifying information for specific cell site devices and/or specific BBU pool devices or the like. Processor 406 can process computer-readable storage medium computer-executable instructions to perform one or more of the functions described herein with reference to forwarding device 134. Data storage 408 can store identification/forwarding/routing information for one or more cell site devices in the network, identification/forwarding/routing information for one or more BBU pool devices in the network, the contents of the forwarding table (e.g., forwarding table 137 of FIG. 1) and the like. In some embodiments, data storage 408 can store forwarding table 137.

Figure 5:
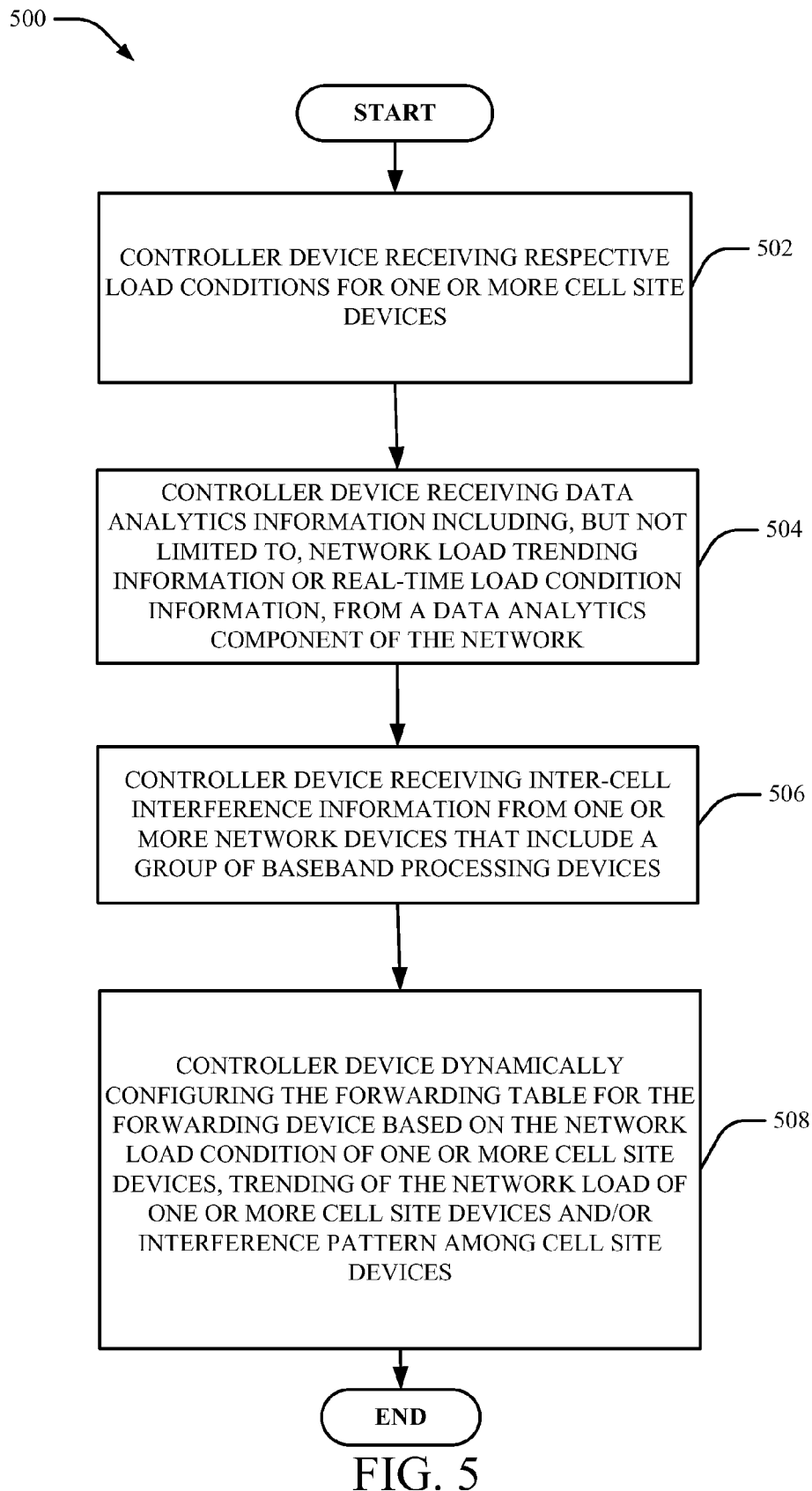
FIGS. 5-9 illustrate example flowcharts of methods that facilitate mobility dimensioning via dynamic configuration of a CPRI switch device in accordance with one or more embodiments. in accordance with one or more embodiments.

FIGS. 5-9 illustrate example flowcharts of methods that facilitate mobility dimensioning via dynamic configuration of a CPRI switch device in accordance with one or more embodiments described herein. Turning first to FIG. 5, at 502, method 500 can include the controller device receiving respective load conditions for one or more cell site devices. For example, the controller device can receive information indicative of different load conditions (e.g., amount of loading at a cell site device) at different times for the same cell site device and/or different loading at the same time for different cell site devices.

At 504, method 500 can include the controller device receiving data analytics information for the network. The data analytics information can include, but is not limited to, network load trending information, real-time network load condition information or the like. The data analytics information can be received from any device that can obtain and/or transmit information about the state of the network.

At 506, method 500 can include the controller device receiving inter-cell (or, in some embodiments, device-to-device) interference information from one or more network devices that include a group of baseband processing devices (e.g., BBU pool devices). For example, the inter-cell interference information can specify two or more cell site devices associated with corresponding cell site regions that have a particular level of inter-cell interference between the cell site regions.

At 508, method 500 can include the controller device dynamically configuring the CPRI switch device based on the network load condition of one or more cell site devices, the trending of the network load of one or more cell site devices, the interference pattern (e.g., inter-cell interference) among cell site devices and/or device-to-device interference.

Figure 6:
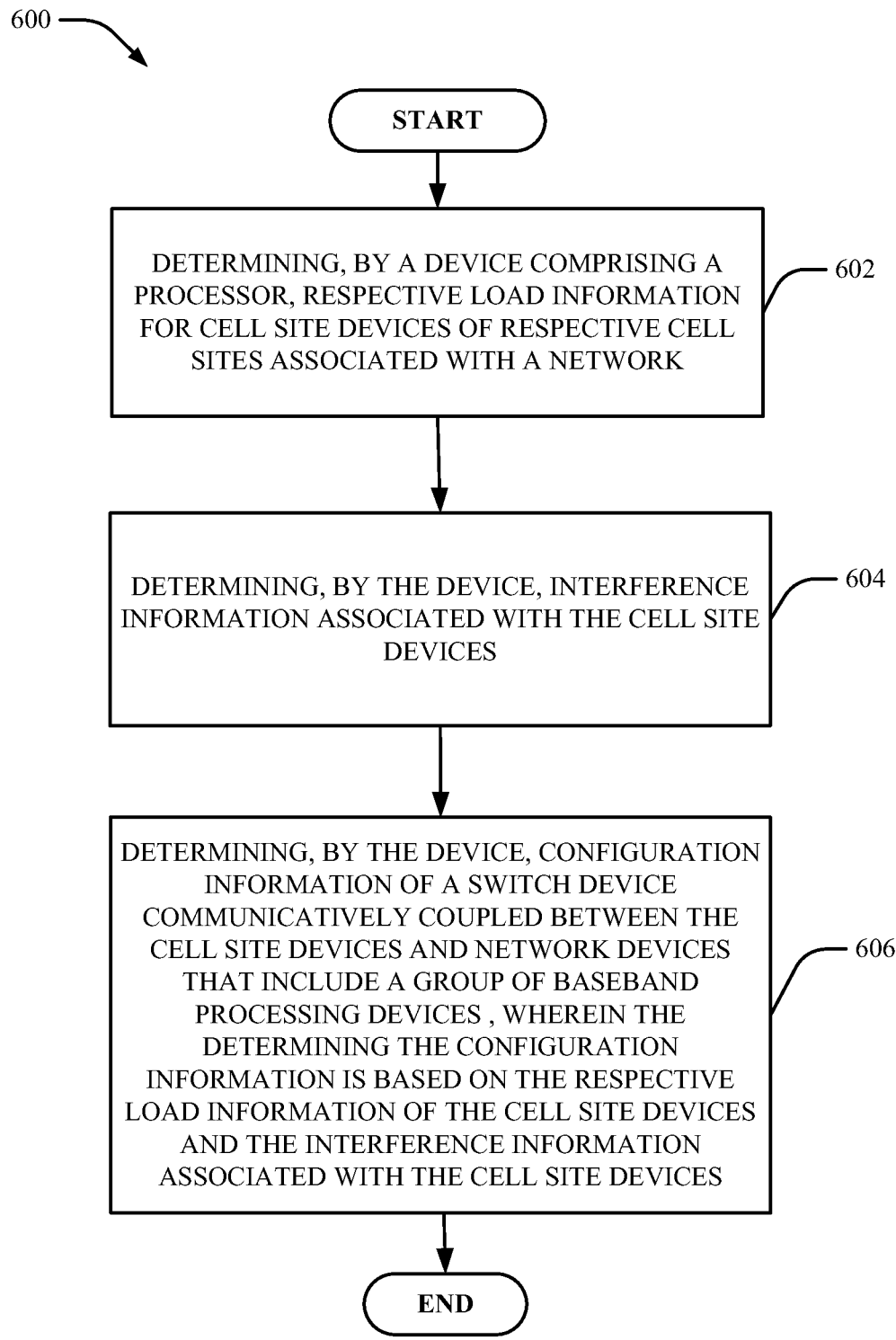

Turning first to FIG. 6, at 602, method 600 can include determining, by a device including a processor, respective load information for cell site devices of respective cell sites associated with a network. In some embodiments, the load information comprises load trending information indicative of respective expected load conditions for the cell site devices. As such, the information can be indicative of estimated future load conditions for one or more cell site devices. The future load conditions can be based on historical information regarding loading at particular cell site devices with the assumption that future loading may follow a pattern similar to past loading for a particular cell site device.

In another embodiment, the expected load information can be based on direction of movement and/or location of mobile devices associated with one or more cell site devices. In this embodiment, mobile devices moving towards a new cell site region (or that have traditionally traveled through a particular cell site region at a particular time of day or day of week) or that are near the boundary of a particular cell site region and likely to travel into a new cell site region can be treated as if the load of the mobile device will be associated with the new cell site region at a particular defined time. The expected load condition for the cell site device associated with the new cell site region can be updated accordingly.

At 604, method 600 can include determining, by the device, interference information associated with the cell site devices. At 606, method 600 can include determining, by the device, configuration information of a switch device (e.g., CPRI switch device) communicatively coupled between the cell site devices and network devices that include a group of baseband processing devices (e.g., BBU pool devices of the network), wherein the determining the configuration information is based on the respective load information of the cell site devices, the interference information associated with the cell site devices and/or device-to-device interference. In some embodiments, the configuration information of the switch device includes information indicating a first identity of a cell site device of the cell site devices and a second identity of a BBU pool device of the BBU pool devices to communicatively couple to one another.

In some embodiments, determining the configuration information includes generating forwarding table configuration information for the switch device based on the respective load information for the cell site devices of respective cell sites. The forwarding table information can include a mapping between one or more cell site devices and a BBU pool device such that information received at the switch device, for example, from a particular cell site device, will be transmitted from the switch device to a particular BBU pool device assigned with the one or more particular cell site devices.

In some embodiments, although not shown, the method can also include determining, by the device, network traffic trending information associated with the cell site devices. In this embodiment, the determining the configuration information is further based on the network traffic trending information.

Although not shown, in various embodiments, method 600 can also include changing or updating forwarding table information in response to device receipt of new or updated load information for the one or more cell site devices, inter-cell interference information, network traffic trending information or the like.

As such, the device is configured to perform resource management control function by providing the configuration information and the switch device is configured to perform forwarding function of information from the cell site devices to the baseband processing unit pool devices.

Figure 7:
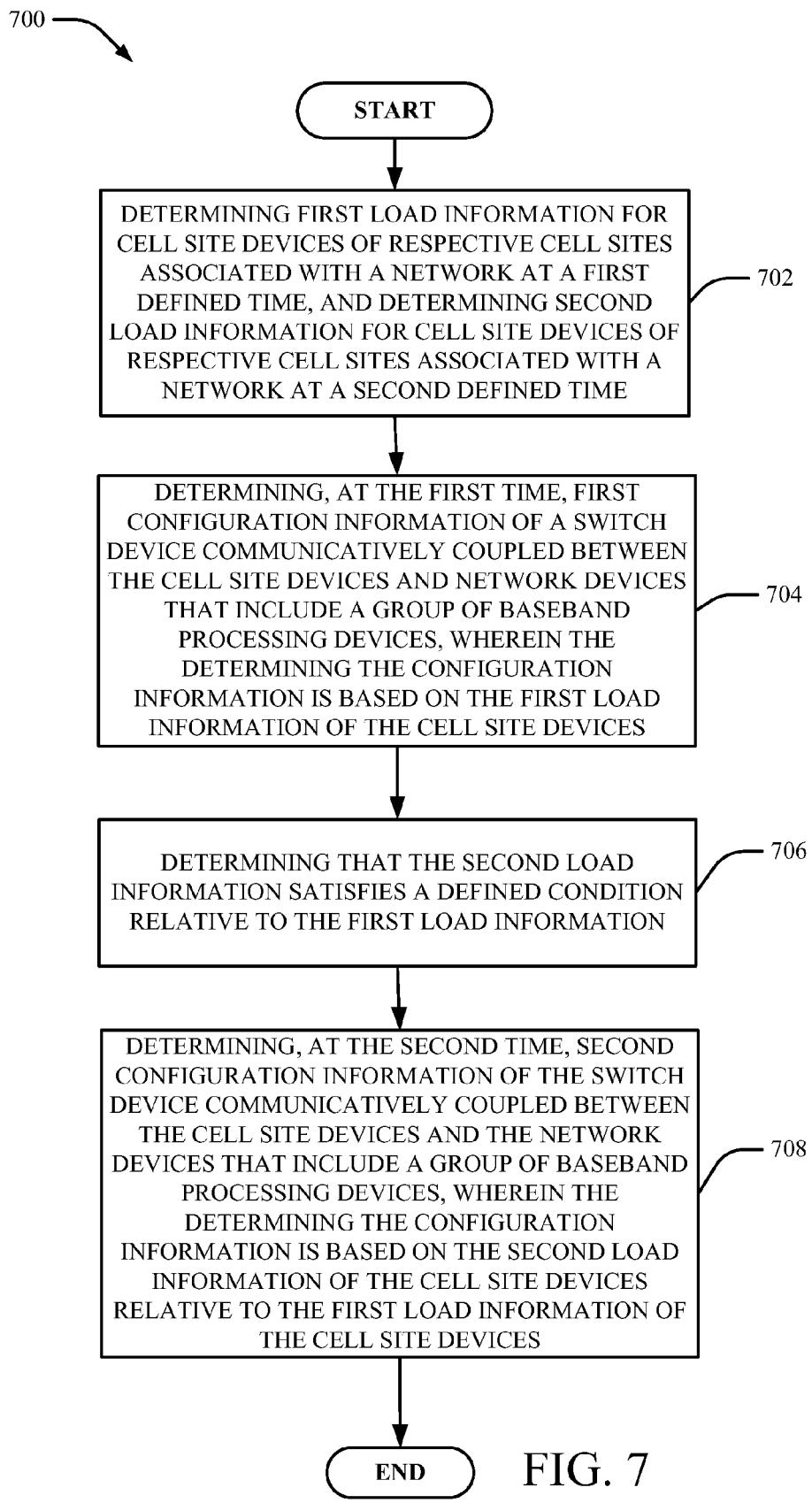

Turning now to FIG. 7, at 702, method 700 can include determining first load information for cell site devices of respective cell sites associated with a network at a first defined time, and determining second load information for cell site devices of respective cell sites associated with a network at a second defined time. In some embodiments, the first load information includes load trending information indicative of respective expected load conditions for the cell site devices at the first time.

At 704, method 700 can include determining, at the first time, first configuration information of a switch device communicatively coupled between the cell site devices and baseband processing unit pool devices of the network, wherein the determining the configuration information is based on the first load information of the cell site devices. The configuration information of the switch device includes information indicating a first identity of a cell site device of the cell site devices and a second identity of a network device that include a group of baseband processing devices (e.g., BBU pool device) to communicatively couple to one another.

At 706, method 700 can include determining that the second load information satisfies a defined condition relative to the first load information. At 708, method 700 can include determining, at the second time, second configuration information of the switch device communicatively coupled between the cell site devices and the network devices that include a group of baseband processing devices, wherein the determining the configuration information is based on the second load information of the cell site devices relative to the first load information of the cell site devices.

In some embodiments, the device is configured to perform resource management control function by providing the configuration information and the switch device is configured to perform forwarding function of information from the cell site devices to the baseband processing unit pool devices.

Although not shown, in some embodiments, the method also includes determining network traffic trending information associated with the cell site devices. In this case, the determining the configuration information is further based on the network traffic trending information. Further, the determining the first configuration information can include generating forwarding table configuration information for the switch device based on the first load information for the cell site devices of respective cell sites.

Figure 8:
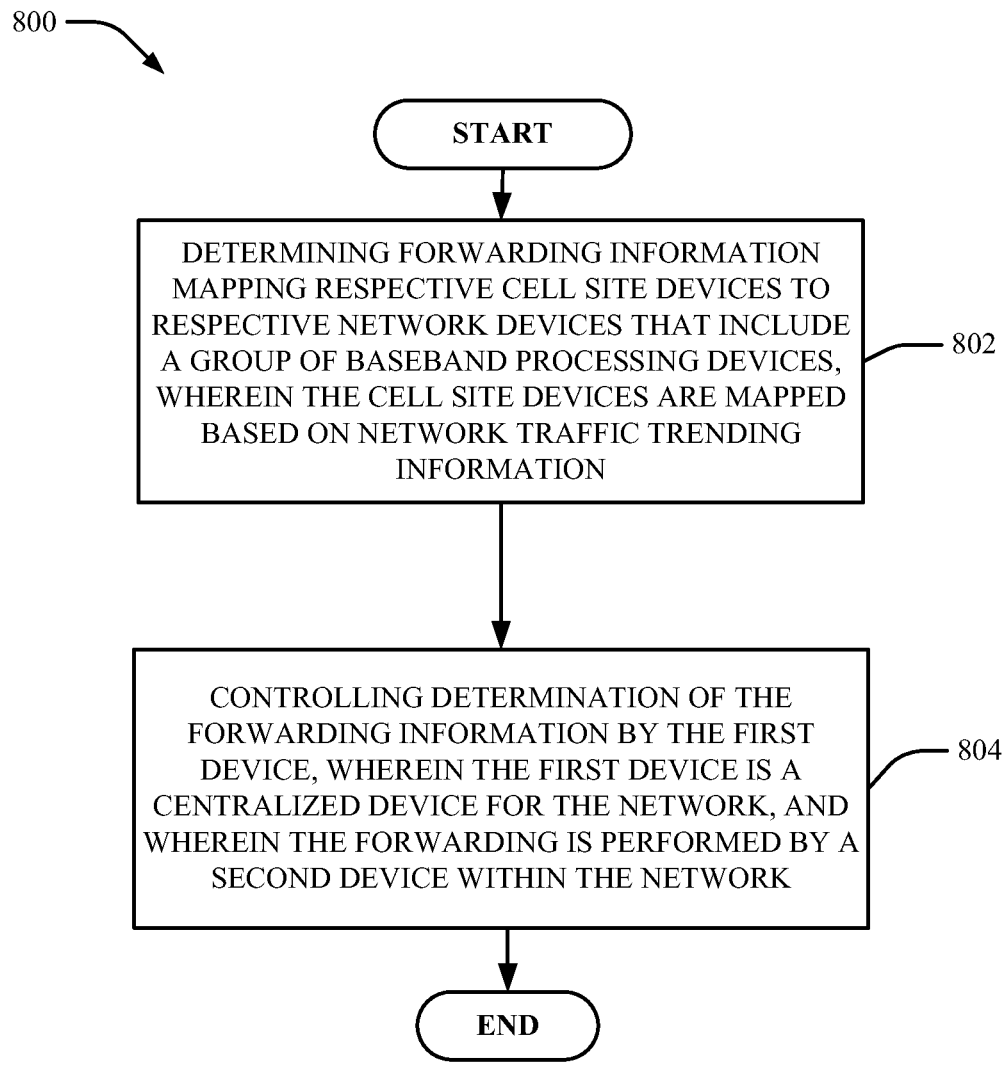

Turning now to FIG. 8, at 802, method 800 can include determining forwarding information mapping respective cell site devices to respective network devices that include a group of baseband processing devices (e.g., BBU pool devices), wherein the cell site devices are mapped based on network traffic trending information.

At 804, method 800 can include controlling determination of the forwarding information by the first device, wherein the first device is a centralized device for the network, and wherein the forwarding is performed by a second device within the network. In some embodiments, although not shown, the method can also include evaluating historical data to determine ones of the cell site devices with associated cell site regions having a historical amount of overlap that satisfies a defined condition. The method can also include grouping the ones of the cell site devices into a same network device.

In some embodiments, adaptive grouping of selected cell site devices of the cell site devices with the same network device (e.g., same BBU pool device) is performed based on estimated interference conditions. For instance, it is desirable to have cell site devices with stronger interference relations (uplink or downlink) be associated with the same BBU pool, thereby making it more likely for such cell site devices to be dynamically organized into Coordinated Multi-Point (CoMP) transmission clusters for interference coordination or mitigation. Controller device 146 can dynamically configure the CPRI switch device and establish the mentioned association based on the interference conditions.

In some embodiments, although not shown, the method also includes adaptive grouping of cell site devices to a network device based on the load information for the cell site devices. One use case can be to use the load information to improve the BBU pooling efficiency. For example, the load condition for cell site devices in an area with mix of residential, financial district, malls could be quite uncorrelated, and these areas may hit peak hour at different times. Controller device 146 can group the different cell site devices based on their historical load information and explore the peak-average difference. Controller device 146 can further dynamically regroup the cell site devices based on the real-time load condition and achieve the maximum pooling gain.

In some embodiments, the method also includes determining network traffic trending information associated with the cell site devices. In this embodiment, determining the forwarding information is further based on the network traffic trending information.

Figure 9:
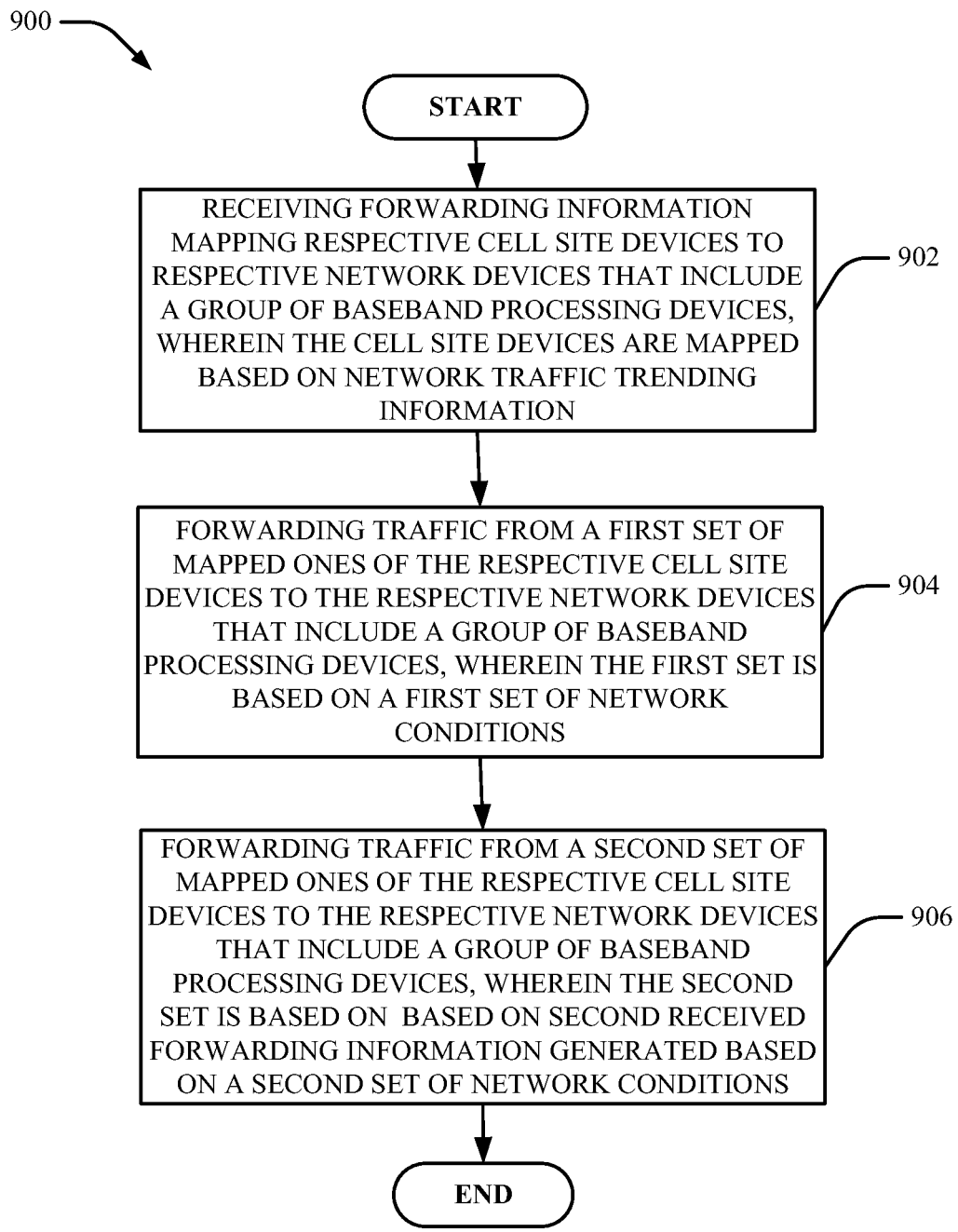

Turning now to FIG. 9, at 902, method 900 can include receiving forwarding information mapping respective cell site devices to respective network devices that include a group of baseband processing devices (e.g., BBU pool devices), wherein the cell site devices are mapped based on network traffic trending information. At 904, method 900 can include forwarding traffic from a first set of mapped ones of the respective cell site devices to the respective network devices that include a group of baseband processing devices, wherein the first set is based on a first set of network conditions. At 906, method 900 can include forwarding traffic from a second set of mapped ones of the respective cell site devices to the respective network devices that include a group of baseband processing devices, wherein the second set is based on based on second received forwarding information generated based on a second set of network conditions.

Figure 10:
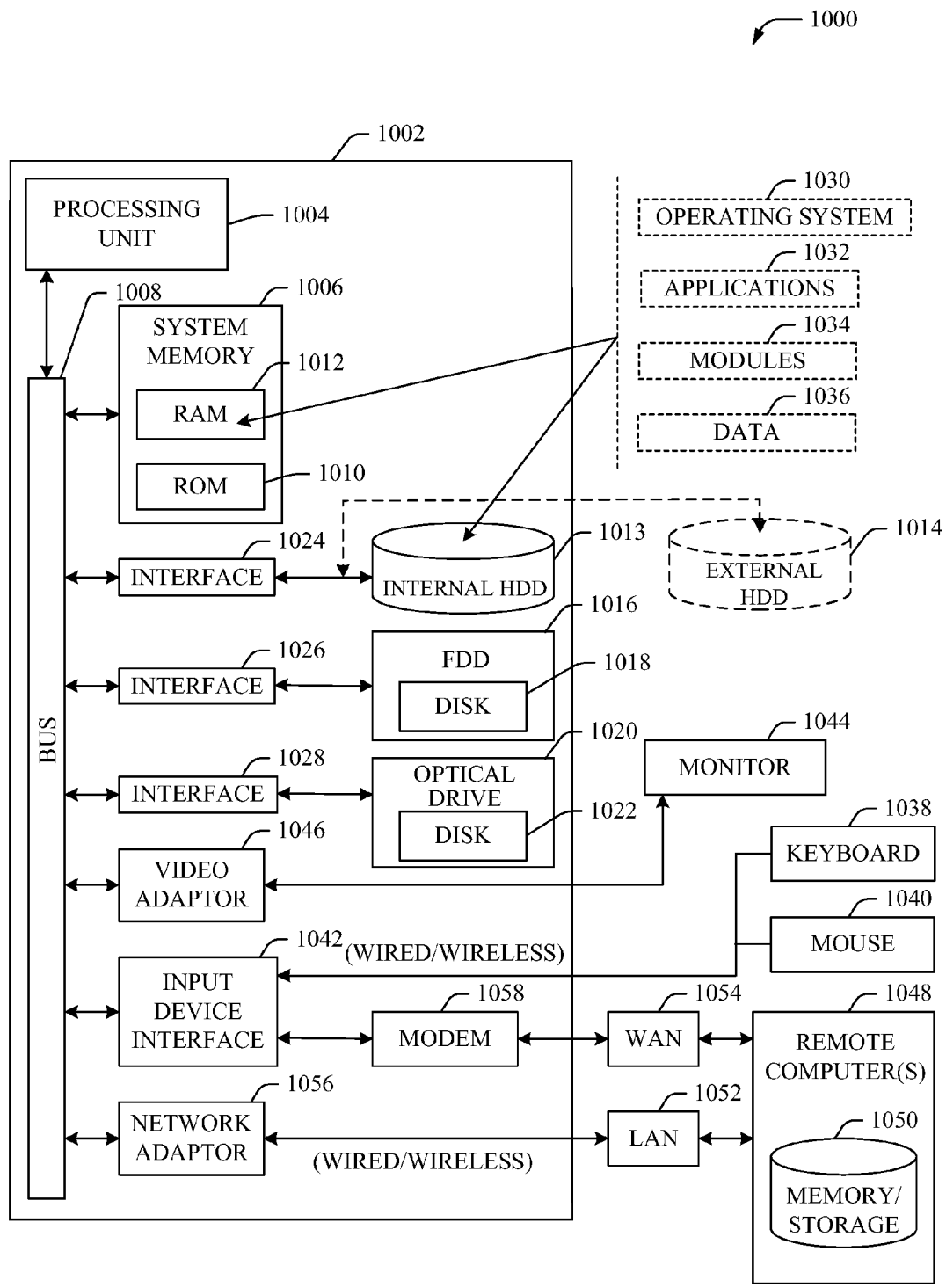
FIG. 10 illustrates a block diagram of a computer operable to facilitate mobility dimensioning via dynamic configuration of a CPRI switch device in accordance with one or more embodiments. in accordance with one or more embodiments.

FIG. 10 illustrates a block diagram of a computer operable to facilitate mobility dimensioning via dynamic configuration of a CPRI switch device in accordance with one or more embodiments. in accordance with one or more embodiments. For example, in some embodiments, the computer can be or be included within any number of components described herein including, but not limited to, controller device (or any components thereof) and/or forwarding device (or any components thereof).

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1013 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations includes at least one or both of Universal Serial Bus (USB) and Institute of Electrical and Electronics Engineers (IEEE) 1374 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A mobile device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1374 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storage, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    determining, by a device comprising a processor, respective load information for cell site devices of respective cell sites associated with a network;
    determining, by the device, interference information associated with the cell site devices; and
    determining, by the device, configuration information of a switch device communicatively coupled between the cell site devices and network devices that include a group of baseband processing devices, wherein the determining the configuration information is based on the respective load information of the cell site devices and the interference information associated with the cell site devices, wherein the determining the configuration information comprises generating forwarding table configuration information for the switch device based on the respective load information for the cell site devices of respective cell sites and wherein the forwarding table configuration information comprises information that configures a forwarding data structure comprising data used in connection with forwarding traffic between the cell site devices and a network device of the network devices.

2. The method of claim 1, wherein the load information comprises load trending information indicative of respective projected load conditions for the cell site devices.

3. The method of claim 2, wherein the configuration information of the switch device comprises information indicating a first identity of a cell site device of the cell site devices.

4. The method of claim 3, wherein the information further indicates a second identity of a network device of the network devices to communicatively couple to one another.

5. The method of claim 1, further comprising:
   determining, by the device, network traffic trending information associated with the cell site devices, wherein the network traffic trending information comprises information representing changes in network traffic associated with the cell site devices.

6. The method of claim 4, wherein the determining the configuration information is further based on the network traffic trending information.

7. The method of claim 1, wherein the device is configured to perform a resource management control function by providing the configuration information and the switch device is configured to perform a forwarding function of information from the cell site devices to a network device of the network devices.

8. An apparatus, comprising:
   a processor; and
   a memory that stores executable instructions that, when executed by the processor, facilitate performance of operations, comprising:
      determining first load information for cell site devices of respective cell sites associated with a network at a first defined time, and determining second load information for the cell site devices of the respective cell sites associated with the network at a second defined time;
      determining, at the first defined time, first configuration information of configuration information of a switch device communicatively coupled between the cell site devices and network devices that include a group of baseband processing devices, wherein the determining the first configuration information is based on the first load information of the cell site devices;
      determining that the second load information satisfies a defined condition relative to the first load information; and
      determining, at the second defined time, second configuration information of the switch device communicatively coupled between the cell site devices and the network devices that include a group of baseband processing devices, wherein the determining the second configuration information is based on the second load information of the cell site devices relative to the first load information of the cell site devices.

9. The apparatus of claim 8, wherein the first load information comprises load trending information indicative of respective estimated future load conditions for the cell site devices at the first defined time.

10. The apparatus of claim 9, wherein the configuration information of the switch device comprises information indicating a first identity of a cell site device of the cell site devices and a second identity of a network device of the network devices to communicatively couple to one another.

11. The apparatus of claim 8, wherein the operations further comprise:
    determining network traffic trending information associated with the cell site devices, wherein the network traffic trending information comprises information representing changes in network traffic associated with the cell site devices.

12. The apparatus of claim 11, wherein determining the configuration information is further based on the network traffic trending information.

13. The apparatus of claim 8, wherein the determining the first configuration information comprises generating forwarding table configuration information for the switch device based on the first load information for the cell site devices of respective cell sites.

14. The apparatus of claim 8, wherein the device is configured to perform a resource management control function by providing the configuration information and the switch device is configured to perform a forwarding function of information from the cell site devices to a network device of the network devices.

15. A non-transitory machine-readable storage medium, comprising executable instructions that, when executed by a processor, facilitate performance of operations, comprising:
    determining forwarding information mapping respective cell site devices to respective network devices that include a group of baseband processing devices, wherein the cell site devices are mapped based on network traffic trending information, wherein the network traffic trending information comprises information representing changes in network traffic associated with the cell site devices, and wherein the determining the forwarding information comprises
    evaluating historical data to determine ones of the cell site devices with associated cell site regions having a historical amount of overlap that satisfies a defined condition; and controlling determination of the forwarding information, wherein forwarding according to the forwarding information is to be performed by a second device within the network, the first device being distinct from the second device, wherein the determining the forwarding information comprises grouping the ones of the cell site devices into a same network device of the network devices.

16. The non-transitory machine-readable storage medium of claim 15, wherein the determining the forwarding information comprises: adaptive grouping of selected cell site devices of the cell site devices with a network device of the network devices based on estimated interference mitigation between the selected cell site devices.

17. The non-transitory machine-readable storage medium of claim 15, wherein the operations further comprise: steering network traffic to a cell site device of the cell site devices based on performance information representing respective performances of the cell site devices and the bad information for the cell site devices.

18. The machine-readable storage medium of claim 17, wherein the determining the forwarding information is further based on the network traffic trending information.

19. The non-transitory machine-readable storage medium of claim 15, wherein the operations further comprise: determining network traffic trending information associated with the cell site devices.

20. The non-transitory machine-readable storage medium of claim 19, wherein the network traffic trending information comprises information representing changes in network traffic associated with the cell site devices.

* * * * *